(12) United States Patent
Yabe et al.

(10) Patent No.: US 11,271,400 B2
(45) Date of Patent: Mar. 8, 2022

(54) POWER CONTROL DEVICE, OPERATION PLAN PLANNING METHOD, AND RECORDING MEDIUM

(71) Applicant: Mitsubishi Electric Corporation, Tokyo (JP)

(72) Inventors: Masaaki Yabe, Tokyo (JP); Yuki Ogawa, Tokyo (JP); Ichiro Maruyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/759,245

(22) PCT Filed: Dec. 10, 2015

(86) PCT No.: PCT/JP2015/084661
§ 371 (c)(1),
(2) Date: Mar. 12, 2018

(87) PCT Pub. No.: WO2017/098631
PCT Pub. Date: Jun. 15, 2017

(65) Prior Publication Data
US 2018/0262003 A1    Sep. 13, 2018

(51) Int. Cl.
*H02J 3/14*    (2006.01)
*H02J 13/00*   (2006.01)
(Continued)

(52) U.S. Cl.
CPC ............. *H02J 3/14* (2013.01); *G01W 1/10* (2013.01); *H02J 3/383* (2013.01); *H02J 13/00* (2013.01);
(Continued)

(58) Field of Classification Search
CPC .... H02J 3/14; H02J 3/383; H02J 13/00; H02J 3/003; H02J 2203/20; H02J 2310/14;
(Continued)

(56) References Cited

U.S. PATENT DOCUMENTS 9,559,549 B2    1/2017  Murayama et al.
2004/0254899 A1  12/2004  Abe et al.
(Continued)

FOREIGN PATENT DOCUMENTS

JP    2004-336890 A    11/2004
JP    2005-012912 A     1/2005
(Continued)

OTHER PUBLICATIONS

International Search Report of the International Searching Authority dated Feb. 9, 2016 for the corresponding international application No. PCT/JP2015/084661 (and English translation).
(Continued)

*Primary Examiner* — Jason Lin
(74) *Attorney, Agent, or Firm* — Posz Law Group, PLC

(57) ABSTRACT

A prediction calculator uses a prediction model to determine a predicted value of an amount of power to be generated by a power generation apparatus and a predicted value of an amount of power to be consumed by an appliance. The predicted values are associated with accuracy information. An operation planner makes an operation plan using the predicted values determined by the prediction calculator, a user schedule included in user setting information, and an electricity rate table or weather forecast information. When the accuracy of the predicted value is lower than a predetermined reference, the operation planner makes the operation plan only using other information without using the predicted value.

15 Claims, 7 Drawing Sheets

(51) Int. Cl.
*H02S 50/00* (2014.01)
*H02S 50/10* (2014.01)
*G01W 1/10* (2006.01)
*H02J 3/38* (2006.01)
*H02J 3/00* (2006.01)

(52) U.S. Cl.
CPC .............. *H02S 50/00* (2013.01); *H02S 50/10* (2014.12); *H02J 3/003* (2020.01); *H02J 2203/20* (2020.01); *H02J 2310/14* (2020.01); *Y02A 30/00* (2018.01); *Y02B 70/30* (2013.01); *Y02B 70/3225* (2013.01); *Y02E 10/56* (2013.01); *Y02E 40/70* (2013.01); *Y04S 10/123* (2013.01); *Y04S 20/222* (2013.01); *Y04S 20/242* (2013.01)

(58) Field of Classification Search
CPC ...... H02J 3/004; H02J 13/00004; H02J 3/381; H02J 2300/24; H02S 50/10; H02S 50/00; G01W 1/10; Y02A 30/00; Y02B 70/30; Y02B 70/3225; Y02E 10/56; Y02E 40/70; Y04S 20/222; Y04S 20/242; Y04S 10/123
See application file for complete search history.

(56) References Cited

U.S. PATENT DOCUMENTS

| | | | | |
|---|---|---|---|---|
| 2012/0221158 A1* | 8/2012 | Krok | ...................... | G06Q 10/04 700/291 |
| 2012/0316807 A1* | 12/2012 | Madrazo | ................ | G01D 4/002 702/61 |
| 2013/0173075 A1* | 7/2013 | Mitsumoto | ............... | H02J 3/00 700/291 |
| 2013/0211599 A1* | 8/2013 | Yachiku | ................ | G05B 19/02 700/275 |
| 2014/0136131 A1 | 5/2014 | Fujimori et al. | | |
| 2014/0207363 A1* | 7/2014 | Kanno | ................ | B60L 15/2045 701/123 |
| 2014/0358307 A1 | 12/2014 | Taniguchi et al. | | |
| 2015/0019036 A1 | 1/2015 | Murayama et al. | | |
| 2015/0127425 A1* | 5/2015 | Greene | ..................... | H02J 3/32 705/7.31 |
| 2015/0190036 A1* | 7/2015 | Saadat | ................ | A61B 1/0008 600/175 |
| 2017/0278039 A1* | 9/2017 | Saito | ...................... | G06Q 50/06 |

FOREIGN PATENT DOCUMENTS

| | | | | |
|---|---|---|---|---|
| JP | 2006-304402 A | | 11/2006 | |
| JP | 2010-057262 A | | 3/2010 | |
| JP | 2010271852 A | * | 12/2010 | |
| JP | 2011-130584 A | | 6/2011 | |
| JP | 2011-259656 A | | 12/2011 | |
| JP | 2013-012080 A | | 1/2013 | |
| JP | 2014-098601 A | | 5/2014 | |
| JP | 2015-012783 A | | 1/2015 | |
| JP | 2015-023724 A | | 2/2015 | |
| JP | 2015-162925 A | | 9/2015 | |
| KR | 101529678 B1 | * | 6/2015 | ............. H02S 20/32 |
| WO | 2015/002092 A1 | | 1/2015 | |

OTHER PUBLICATIONS

Extended European Search Report dated Nov. 6, 2018 issued in corresponding European patent application No. 15910247.4.
Office action dated Feb. 5, 2019 issued in corresponding JP patent application No. 2017-554736 (and English translation thereof).
Office Action dated Jan. 14, 2020 issued in corresponding IN patent application No. 201847017469 (and English translation).
Office Action dated Mar. 5, 2020 issued in corresponding EP patent application No. 15 910 247.4.
Office Action dated Jul. 28, 2020, issued for the corresponding BR patent application No. 1120180083771 and the English Translation.
Office Action dated Aug. 4, 2020, issued for the corresponding CN patent application No. 201580084842.2 and the English Translation.
Office Action (Summons to attend oral proceeding) dated Nov. 5, 2020, issued for the corresponding EP patent application No. 15910247.4.
Office Action dated Mar. 8, 2021 issued in corresponding CN patent application No. 201580084842.2 (and English machine translation).
Office Action dated Nov. 1, 2021 issued in corresponding CN patent application No. 201580084842.2 (and English machine translation).

* cited by examiner

POWER CONTROL DEVICE, OPERATION PLAN PLANNING METHOD, AND RECORDING MEDIUM

CROSS REFERENCE TO RELATED APPLICATION

This application is a U.S. national stage application of International Patent Application No. PCT/JP2015/084661 filed on Dec. 10, 2015, the disclosure of which is incorporated herein by reference.

TECHNICAL FIELD

The present disclosure relates to a technique for proper use of a predicted value.

BACKGROUND ART

In recent years, a power generation apparatus and a power storage apparatus are installed in a home system, such as a home energy management system (HEMS), to implement management and control of energy.

Patent Literature 1, for example, discloses, as a technology for such a home system, a photovoltaic (PV) system capable of performing detailed prediction of an amount of solar radiation.

CITATION LIST

Patent Literature

Patent Literature 1: Unexamined Japanese Patent Application Kokai Publication No. 2014-98601

SUMMARY OF INVENTION

Technical Problem

The PV system of Patent Literature 1 extracts a solar radiation parameter and a temperature parameter from measurement outputs of a solar panel, and predicts a PV output by calculation using the parameters. The PV system then correlates a predicted value with a measured value, and obtains an amount of solar radiation using a temperature correction coefficient that is obtained such that a correlation coefficient between the predicted value and the measured value is a maximum.

In Patent Literature 1, efforts for improving precision of prediction are described, but a predicted value is used without any consideration of an accuracy of the predicted value, that is, a degree indicating how reliable the predicted value is. Management and control of energy with proper use of the predicted value are thus not provided.

Accordingly, a technique for proper use of a predicted value of power is desired.

The present disclosure is made to solve the problem described above, and thus an objective of the present invention is to provide a power control device, an operation planning method, and a program that can achieve proper use of a predicted value of power.

Solution to Problem

To achieve the foregoing objective, the present disclosure provides a power control device for controlling power consumed or generated in a home and causing a display device to display a predicted value of the power, the power control device including display control means for causing the display device to display a graph of the predicted value as a function of time, the graph showing predicted-value variance.

Advantageous Effects of Invention

The present disclosure enables proper use of a predicted value of power.

DESCRIPTION OF EMBODIMENTS

Embodiments of the present disclosure are described in detail with reference to the drawings. The same reference signs are used for the same or equivalent parts throughout the drawings. Although a home system application of the present disclosure is described below as a specific example, the present disclosure may be applied to a building system in a similar manner as described later. Specifically, embodiments described below are merely for explanatory purpose, and do not limit the scope of the present disclosure. One skilled in the art can use some embodiments in which any or all of the components are replaced with the equivalents thereof, but such embodiments are included in the scope of the present disclosure.

Embodiments

Figure 1:
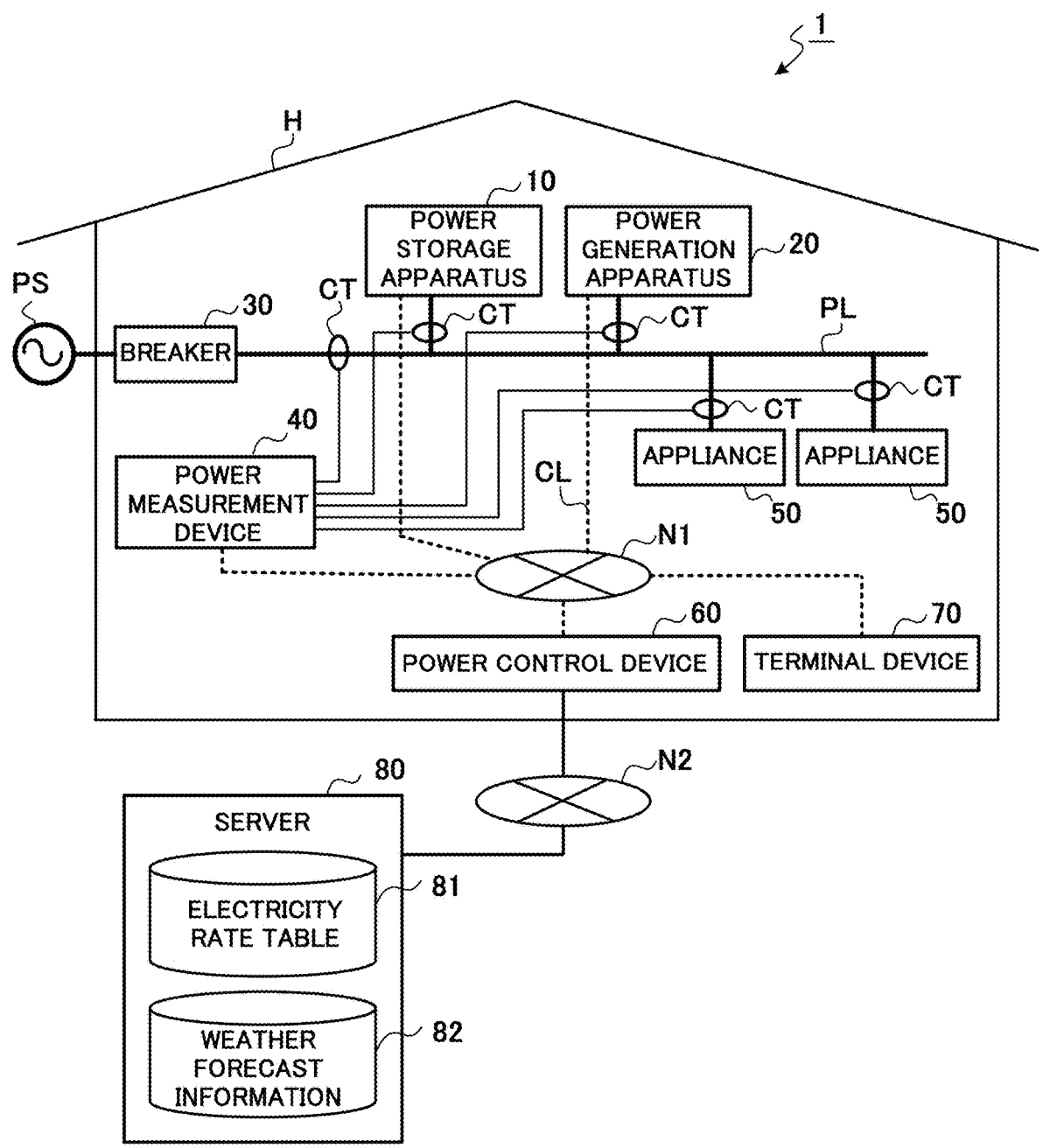
FIG. 1 is a schematic diagram illustrating an example of an overall configuration of a home system according to an embodiment of the present disclosure.

FIG. 1 is a schematic diagram illustrating an example of an overall configuration of a home system 1 according to an embodiment of the present disclosure. As illustrated, the home system 1 includes a power storage apparatus 10 for storing electric power, a power generation apparatus 20 for generating electric power, a breaker 30 for stopping a supply of electric power to a home H, a power measurement device 40 for measuring electric power consumed or generated in the home H, an appliance 50 that consumes electric power in the home H, a power control device 60 for controlling the entire home system 1, and a terminal device 70 for use by a user.

The bold line in FIG. 1 indicates a power line PL. The power storage apparatus 10, the power generation apparatus 20, the breaker 30, and the appliance 50 are connected to the power line PL to receive or provide power via the power line PL. Current transformers CT for measuring power flowing through the power line PL are disposed near those devices.

The dashed lines in FIG. 1 indicate a communication line CL. The power storage apparatus 10, the power generation apparatus 20, the power measurement device 40, the appliance 50, the power control device 60, and the terminal device 70 are connected via the communication line CL to a home network N1. The communication line CL and the home network N1 may be, for example, a wired or wireless local area network (LAN).

The home system 1 can communicate with a server 80 located outside the home H. The server 80 stores an electricity rate table 81 that defines, for example, a rate of electricity (electricity purchase rate) in time periods of the day for a commercial power source PS, that is, commercial power grid. The electricity rate table 81 also includes a purchase rate of generated electric power (electricity selling rate). This purchase rate does not need to be uniform, and may be defined in time periods of the day. The server 80 further stores weather forecast information 82. The weather forecast information 82 may include, for example, forecast weather, a precipitation probability, a forecast temperature, a forecast humidity, and a forecast amount of solar radiation. The power control device 60 is communicably connected via an external network N2 to the server 80, and can retrieve the electricity rate table 81 and the weather forecast information 82.

The power storage apparatus 10 may be, for example, a power storage system including a stationary storage battery (as an example, a lithium-ion battery) and capable of storing (charging) and discharging power. The power storage apparatus 10 is controlled via the communication line CL (home network N1) by the power control device 60, and charges and discharges the storage battery. The power storage apparatus 10 may be, as another example, a power charge and discharge system using an electric car.

The power generation apparatus 20 may be, for example, a photovoltaic power generation system including a solar panel for power generation using sunlight and a power conditioner for converting a DC power into an AC power. The power generation apparatus 20 is controlled via the communication line CL by the power control device 60, and supplies the generated power to appliances 50 in the home H or causes a reverse power flow of surplus power to the commercial power source PS. The power generation apparatus 20 may be a power generation system using wind or a fuel cell.

The breaker 30 interrupts a supply of power from the commercial power source PS to the power line PL in the home H as appropriate. The breaker 30, for example, interrupts an electrical connection between the commercial power source PS and the power line PL when the power supplied from the commercial power source PS to the home H exceeds a rated capacity. The capacity of the breaker 30 is determined, for example when a user sets up a contract with an electric power company. The breaker 30 may be an earth leakage circuit breaker. The breaker 30 may break the connection with the commercial power source PS in case of power outage to achieve a self-sustained operation in the home H.

The power measurement device 40 detects an amount of power flowing through the power line PL using the current transformer CT described above. The power measurement device 40 transmits information of the detected amount of power to the power control device 60. That is, the power measurement device 40 measures, using the current transformer CT, a sold power amount that is a reverse power flow from the power generation apparatus 20 through the power line PL to the commercial power source PS, a purchased power amount that is an inflow from the commercial power source PS to the power line PL, an amount of power generated by the power generation apparatus 20, an amount of power consumed by the appliances 50, an amount of charged power to the power storage apparatus 10, and an amount of discharged power from the power storage apparatus 10 to the power line PL. The power measurement device 40 transmits the measurements to the power control device 60, for example, as information of the sold and purchased power amounts, the amount of power generation, the amount of power consumption, and the amounts of charged and discharged power.

The appliances 50 may be electrical appliances and facility devices, and are power consumed devices that consume power at the home H. Examples of the appliances 50 include a heat pump water heater. The water heater is also referred to as a heat storage device since it stores electricity as heat. FIG. 1 illustrates two appliances 50 located in the home H for ease of description, but the number of appliances 50 can be varied as appropriate in accordance with circumstances.

The power control device 60 is, for example, a home energy management system (HEMS) controller capable of integrally controlling the appliances 50 in the home H. The power control device 60 predicts the amount of power to be generated by the power generation apparatus 20 and an amount of power to be consumed by the appliances 50, and makes an operation plan. As described later, the operation plan includes a control for the appliances 50 as well as a control for the power storage apparatus 10 to charge and discharge power. The power control device 60 controls the power storage apparatus 10 and the appliances 50 in accordance with the operation plan.

Figure 2:
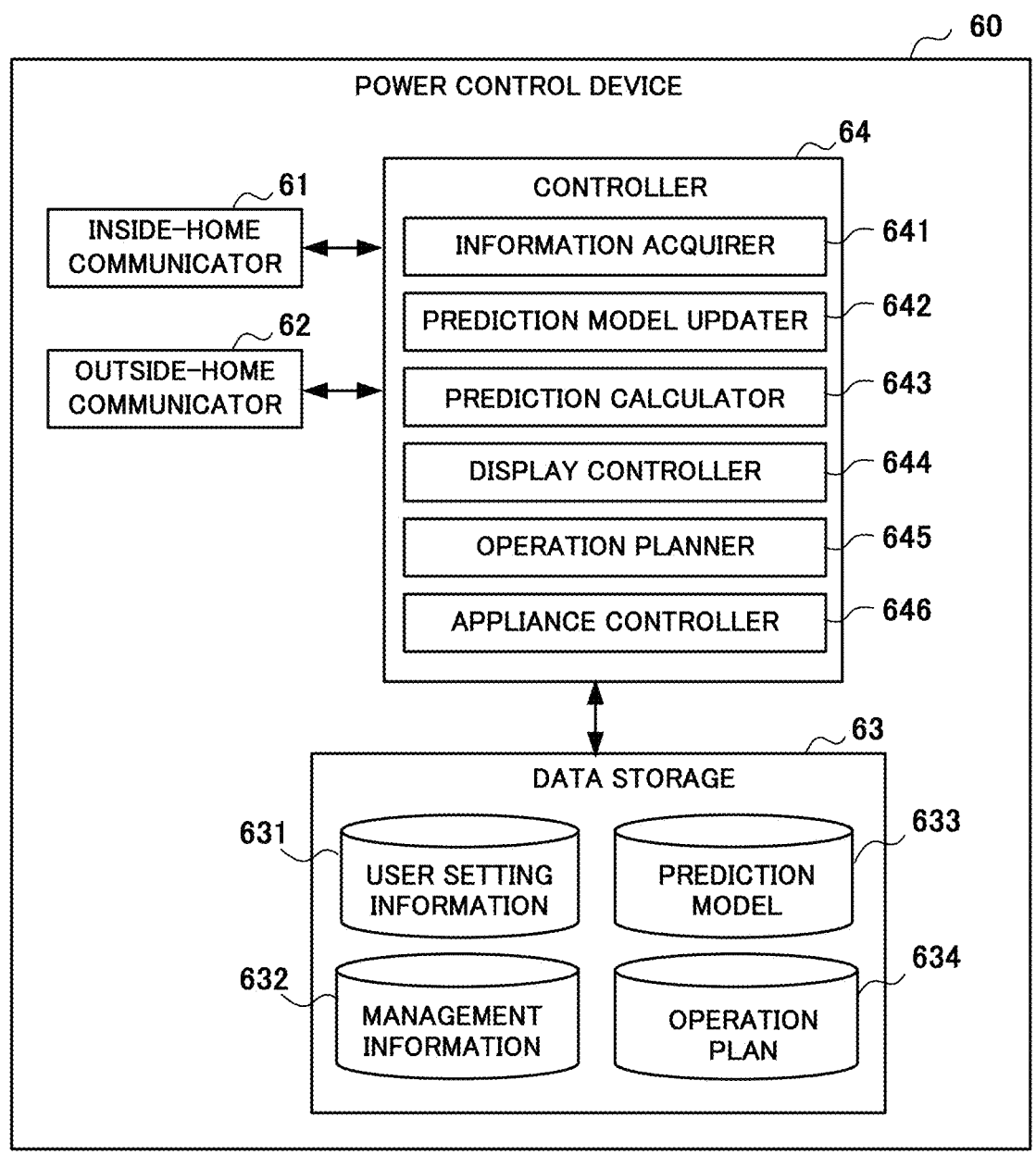
FIG. 2 is a block diagram illustrating an example of a configuration of a power control device.

An example of a configuration of the power control device 60 is described below with reference to FIG. 2. FIG. 2 is a block diagram illustrating an example of the configuration of the power control device 60. As illustrated, the power control device 60 includes an inside-home communicator 61, an outside-home communicator 62, a data storage 63, and a controller 64.

The inside-home communicator 61 is a communication unit for establishing a connection to the home network N1 through the communication line CL, and communicates, under the control of the controller 64, with the power storage apparatus 10, the power generation apparatus 20, the power measurement device 40, the appliances 50, and the terminal device 70. The inside-home communicator 61, for example, receives information of the amount of power sent by the power measurement device 40. The inside-home communicator 61 transmits screen data generated by the controller 64, specifically a display controller 644 described later, to the terminal device 70.

The outside-home communicator 62 is a communication adapter for connection to the external network N2 located outside, and communicates, under the control of the controller 64, with the server 80 located outside. The outside-home communicator 62, for example, receives the above-described electricity rate table 81 and weather forecast information 82 from the server 80.

The data storage 63 may include, for example, non-volatile semiconductor memory, and stores various items of information. Specifically, the data storage 63 stores user setting information 631, management information 632, a prediction model 633, and an operation plan 634.

The user setting information 631 includes, for example, information of a user schedule and a user preference that are set by a user. The user preference is information indicating a course of action referred to when the operation plan is made, and as an example, any preference on economization, energy savings, and comfort is set by the user.

The management information 632 includes, for example, information received from the server 80, an actual value and a predicted value of the amount of power, and information of the current status of the appliance 50. The actual value may be the amount of power generation or the amount of power consumption that is measured by the power measurement device 40. The predicted value may be a predicted value of power generation or a predicted value of load that is predicted by the controller 64, specifically a prediction calculator 643 described later.

The prediction model 633 includes a model for predicting the amount of power to be generated by the power generation apparatus 20 and a model for prediction of the amount of power to be consumed by the appliance 50. The prediction model 633 is used by the prediction calculator 643, and the amount of power generation and the amount of power consumption are predicted per unit time, such as every 30 minutes.

The operation plan 634 is made by the controller 64, specifically an operation planner 645 described later. The operation plan 634 includes, for example, details on the energy-saving control for the appliance 50, and details on the power charge and discharge control for the power storage apparatus 10. The operation plan 634 is referred to by the controller 64, specifically an appliance controller 646 described later, for control of the appliance 50 and the power storage apparatus 10.

The controller 64 includes, for example, a central processing unit (CPU), a read only memory (ROM), and a random access memory (RAM), and controls the entire power control device 60. The controller 64 includes, as functions thereof, an information acquirer 641, a prediction model updater 642, the prediction calculator 643, the display controller 644, the operation planner 645, and the appliance controller 646. These functions are achieved by use of the RAM by the CPU as working memory to run various programs stored in the ROM as appropriate.

The information acquirer 641 acquires necessary information. The information acquirer 641, for example, controls the outside-home communicator 62 to acquire the electricity rate table 81 and weather forecast information 82 from the server 80 through the external network N2. The information acquirer 641 also acquires a request for a demand response (DR) or reduction of the amount of power generation that is issued by an aggregator, specifically an electricity retailer through the external network N2. The demand response is an incentive system for prompting consumers to reduce or shift their demands, in order to maintain the power demand balance. The reduction in the amount of power generation is, for example, a request, issued by the aggregator, for stopping the consumers from selling power when the power supply significantly exceeds the power demand.

The information acquirer 641 controls the inside-home communicator 61 to acquire, through the home network N1, the amount of power generation and the amount of power consumption from the power measurement device 40, and the user schedule and the user preference from the terminal device 70. The information acquirer 641 updates the user setting information 631 and the management information 632 on the basis of the acquired information.

The prediction model updater 642 updates the prediction model 633 using the predicted values and the actual values. The predicted values are the amount of power generation and the amount of power consumption predicted by the prediction calculator 643, and the actual values are the amount of power generation and the amount of power consumption acquired by the information acquirer 641. The prediction model updater 642, for example, uses the predicted value per unit time and the actual value corresponding to the predicted value to statistically process an amount of error in the predicted value, and updates the prediction model 633. The prediction model updater 642 holds the amount of error in the predicted value as accuracy information for the predicted value per unit time. The prediction model updater 642 performs such updating of the prediction model 633 periodically, as an example, once a day.

When the measured value is far from the predicted value and this great difference is caused by a predetermined reason, the prediction model updater 642 updates the prediction model 633 except for the information of the time period in which the reason has occurred. Examples of the predetermined reasons may include, for example, an event in which a water heater included in the appliance 50 operates in a time period different from that of the operation plan due to a time shift caused by a user's manual operation, an event of issuance of the demand response (DR request), and an event of issuance of the reduction in the amount of power generation.

The prediction calculator 643 determines the predicted value using the prediction model 633 updated by the prediction model updater 642. The prediction calculator 643 predicts the amount of power to be generated by the power generation apparatus 20 and the amount of power to be consumed by the appliance 50. Specifically, the prediction calculator 643 determines a predicted value per unit time, such as every 30 minutes, and associates the predicted value with the accuracy information.

The accuracy information is a value represented, in accordance with a relationship between the predicted value per unit time and the actual value, in the form of a dispersion of samples under the same conditions or a hit rate relative to the predicted value. That is, the value being a numerical representation of the relationship between the predicted value and the actual value is used. Thus large dispersion or low hit rate indicates low precision of prediction.

Since the accuracy information is a parameter indicating reliability with respect to the predicted value, another factor may be associated with the predicted value. When the prediction model is built on the basis of the actual value, for example, the prediction calculator 643 may assign a weight to the accuracy in accordance with the weather forecast that differs from the actual value, as an example, the forecast weather or the precipitation probability. Specifically, the prediction calculator 643 assigns a high weight to the accuracy when the condition that the weather is forecast to be clear has a high predictability, or conversely, assigns a low weight to the accuracy when the condition that the weather is forecast to be cloudy has a low predictability. Additionally or alternatively, the prediction calculator 643 may assign a weight to the accuracy on the basis of time, number of elapsed years, and facility condition.

When the actual values used in building the prediction model 633 contain an anomalous value, the prediction calculator 643 may assign a weight to the accuracy in accordance with a proportion of anomalous values in the actual values. Specifically, the prediction calculator 643 assigns a low weight to the accuracy when the proportion of anomalous values is large. The prediction calculator 643 may compare the predicted value with the actual value, and reflect the comparison on the accuracy information in accordance with a misprediction degree. When a plurality of predicted values is used, the prediction calculator 643 may provide new accuracy information using accuracy information of each predicted value.

The prediction calculator 643 performs such prediction calculation, for example at a timing of acquisition of the new weather forecast information 82 from the server 80 or a periodic operation-planning timing. The prediction calculator 643 calculates the predicted value of power generation and the predicted value of load with accuracy information associated with the determined predicted values, and then updates management information 632 with the predicted values.

The display controller 644 generates screen data to be provided on the terminal device 70. Specifically, the display controller 644 generates the screen data including a power generation amount prediction screen P1 as illustrated in FIG. 3A and a power consumption amount prediction screen P2 as illustrated in FIG. 3B.

Figure 3A:
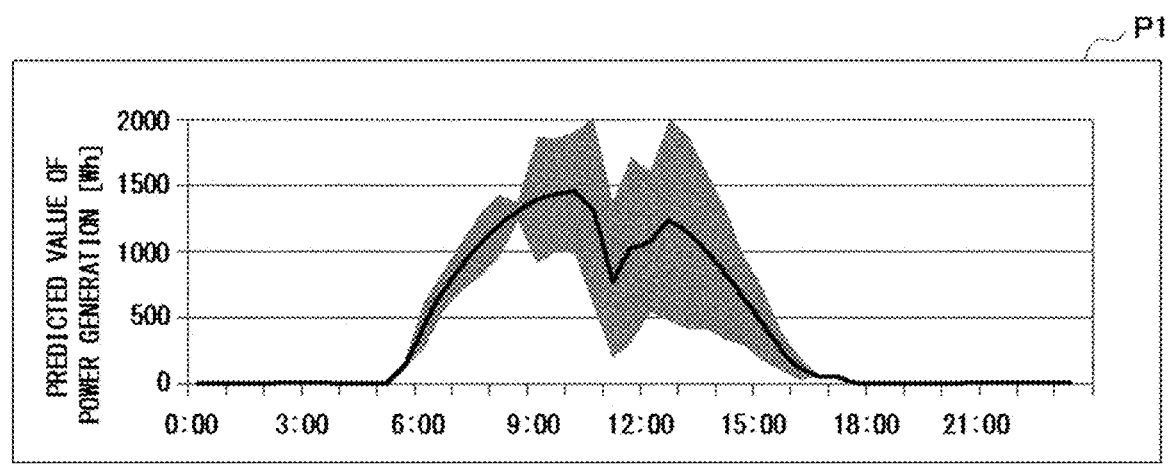
FIG. 3A is a schematic diagram illustrating an example of a power generation amount prediction screen.

FIG. 3A, which is the power generation amount prediction screen P1, is a graph showing the predicted value of power generation as a function of time. In this graph, a degree of variance indicates the accuracy of the predicted value. Specifically, a time period with a narrower range of variance indicates that the predicted value in the time period has a higher accuracy, that is, the reliability of the predicted value is high, while a time period with a wider range of variance indicates that the predicted value in the time period has a lower accuracy, that is the reliability of the predicted value is low. The display controller 644 generates the power generation amount prediction screen P1 on the basis of the predicted value per unit time and the accuracy information for the amount of power generation determined by the prediction calculator 643 as described above.

Figure 3B:
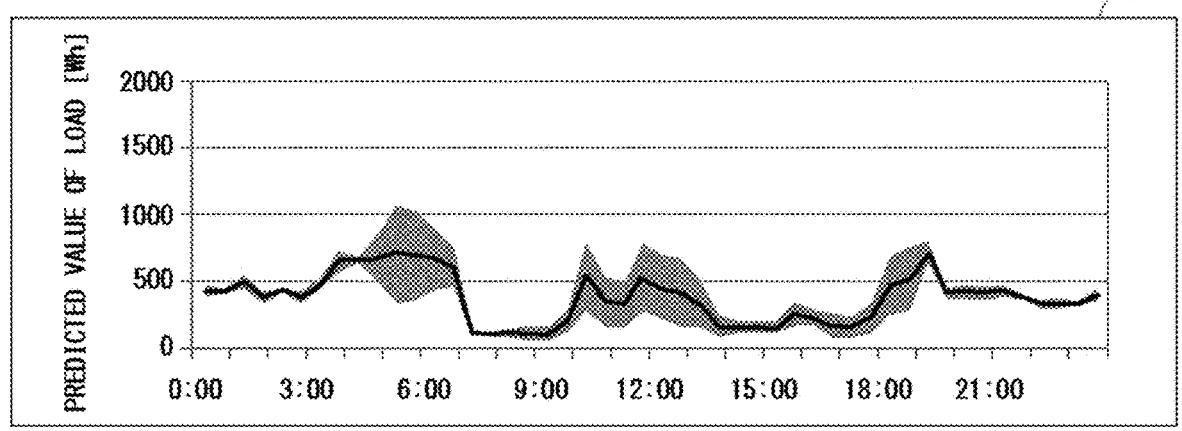
FIG. 3B is a schematic diagram illustrating an example of a power consumption amount prediction screen.

The power consumption amount prediction screen P2 as illustrated in FIG. 3B provides a graph showing the predicted value of load (amount of power consumption) as a function of time. In this graph, the range of variance also indicates the accuracy of the predicted value. The display controller 644 generates the power consumption amount prediction screen P2 on the basis of the predicted value per unit time and the accuracy information for the amount of power consumption determined by the prediction calculator 643 as described above.

The screens P1 and P2 are only examples, and other screens may be used. The display controller 644 may, for example, generate a power generation amount prediction screen P3 as illustrated in FIG. 4A and a power consumption amount prediction screen P4 as illustrated in FIG. 4B.

Figure 4A:
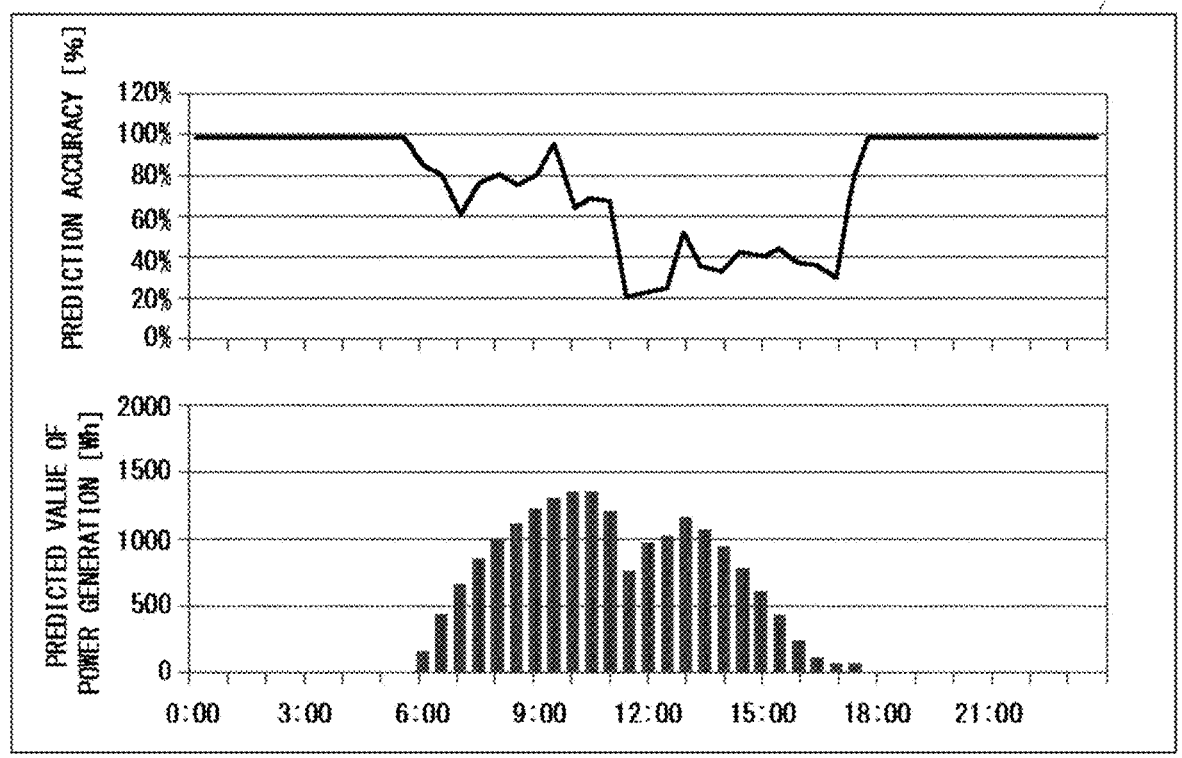
FIG. 4A is a schematic diagram illustrating an example of another power generation amount prediction screen.
Figure 4B:
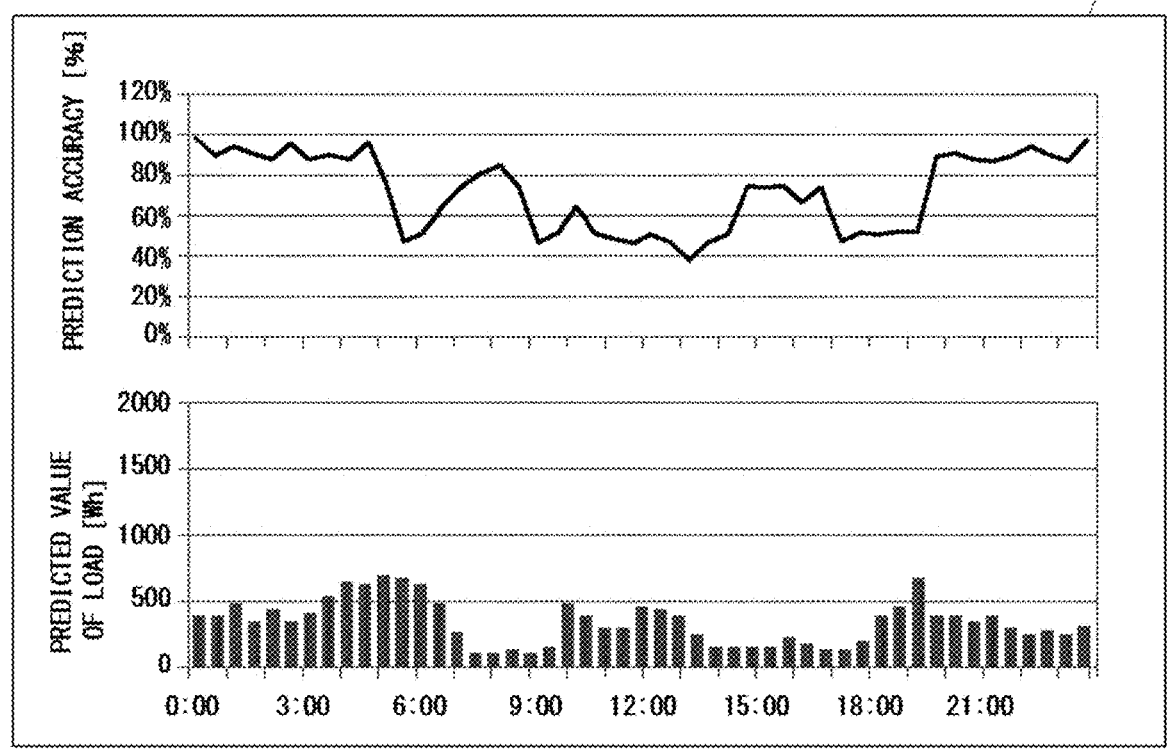
FIG. 4B is a schematic diagram illustrating an example of another power consumption amount prediction screen.

The power generation amount prediction screen P3 as illustrated in FIG. 4A provides graphs separately showing the predicted value of power generation and the prediction accuracy. Specifically, the predicted value of power generation is presented as a bar graph on a time-period basis, while the prediction accuracy is presented as the graph plotted over time. Similarly, the power consumption amount prediction screen P4 as illustrated in FIG. 4B provides graphs separately showing the predicted value of load (amount of power consumption) and the prediction accuracy. Specifically, the predicted value of load is presented as a graph on a time-period basis, while the prediction accuracy is presented as a graph plotted over time.

Referring back to FIG. 2, the operation planner 645 makes the operation plan using the predicted values determined by the prediction calculator 643, the user schedule included in the user setting information 631, and the electricity rate table 81 and the weather forecast information 82 received from the server 80. When the predicted value determined by the prediction calculator 643 has an accuracy lower than a predetermined reference, for example when the diversion is large, the operation planner 645 makes the operation plan only with other information without using the predicted value. As another way of planning, when the accuracy of the predicted value is low, the operation planner 645 may make the operation plan with a tolerance to the predicted value set higher than the tolerance set when the accuracy of the predicted value is high. The operation planner 645 stores the operation plan made as described above in the data storage 63.

The appliance controller 646 controls the power storage apparatus 10 and the appliance 50 in accordance with the operation plan made by the operation planner 645, that is, the operation plan 634 in the data storage 63. The appliance controller 646 periodically acquires the state of appliance 50 by automatic control not based on the operation plan 634, and stores the information of the state by adding to or writing over the management information 632.

Referring back to FIG. 1, the terminal device 70, which is, for example, a portable terminal, such as a tablet terminal or a smartphone, is used by a user. The terminal device 70 displays a screen, for example the power generation amount prediction screen P1 and the power consumption amount prediction screen P2 as described above, on the basis of the screen data transmitted by the power control device 60. The terminal device 70 accepts a user's manual operation, and transmits details of the operation to the power control device 60.

Figure 5:
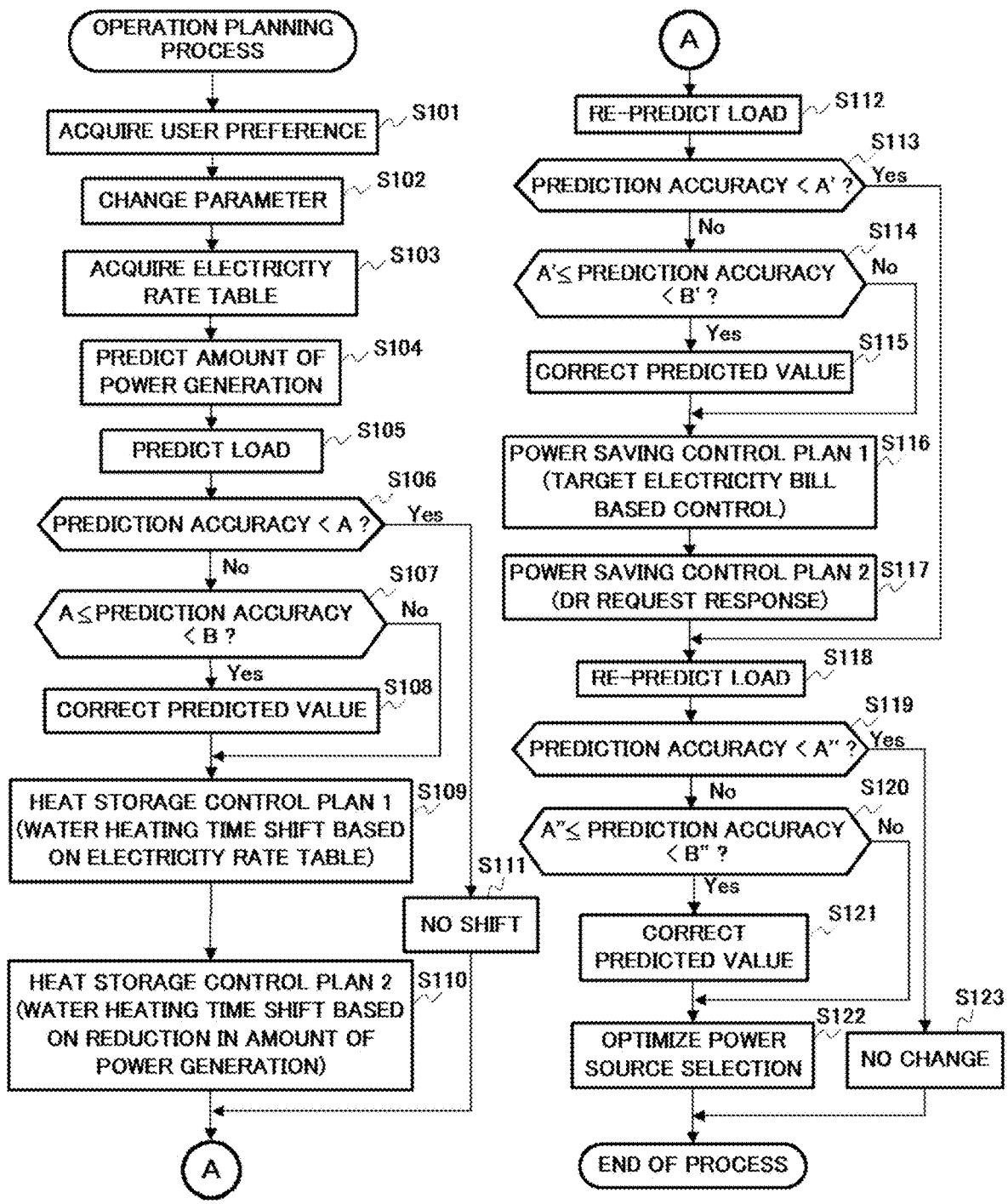
FIG. 5 is a flowchart illustrating an example of an operation planning process according to an embodiment of the present disclosure.

The operation of the power control device 60 (controller 64) according to an embodiment of the present disclosure is described below with reference to FIG. 5. FIG. 5 is a flowchart illustrating an example of an operation planning process performed by the controller 64. The operation planning process starts, for example, periodically or upon request from the user operating the terminal device 70.

Firstly, the controller 64 acquires the user preference (step S101). Specifically, the information acquirer 641 acquires from the terminal device 70 the user preference indicating a course of action used for making the operation plan. More specifically, the information acquirer 641 acquires the user preference on any of economization, energy savings, or comfort. Without any additional user request, the information acquirer 641 acquires the previously set user preference from the management information 632.

The controller 64 changes a parameter (step S102). The controller 64, for example, changes a parameter for optimization of power source selection in accordance with the acquired user preference.

The controller 64 acquires the electricity rate table 81 (step S103). Specifically, the information acquirer 641 controls the outside-home communicator 62 to acquire the electricity rate table 81 via the external network N2 from the server 80. The information acquirer 641 may access the server 80 to confirm whether the electricity rate table 81 is updated, and if not updated, may acquire the previously acquired electricity rate table from the management information 632.

The controller 64 predicts an amount of power generation (step S104). Specifically, the prediction calculator 643 predicts the amount of power to be generated by the power generation apparatus 20. More specifically, the prediction calculator 643 determines a predicted value per unit time, such as every 30 minutes, and associates the predicted value with accuracy information.

The controller 64 predicts a load (step S105). Specifically, the prediction calculator 643 predicts an amount of power to be consumed by the appliance 50. In this case, the prediction calculator 643 determines a predicted value per unit time, such as every 30 minutes, and associates the predicted value with the accuracy information.

The controller 64 may then generate screen data for the predicted values predicted in steps S104 and S105, and cause display of the screen data on the terminal device 70. Specifically, the display controller 644 causes display on the terminal device 70 of the above-described power generation amount prediction screen P1 as illustrated in FIG. 3A and the above-described power consumption amount prediction screen P2 as illustrated in FIG. 3B. As described above, the degree of variance on each of the screens P1 and P2 indicates the accuracy of the predicted value. Specifically, a time period with a narrower range of variance indicates that the predicted value in the time period has a higher accuracy, while a time period with a wider range of variance indicates that the predicted value in the time period has a lower accuracy. The user thus can easily know the reliability of the predicted value of the amount of power generation and the predicted value of the amount of power consumption.

The controller 64 determines whether the prediction accuracy is lower than the reference A (step S106). The reference A is a predetermined value that is a lower limit for keeping the minimum reliability of the predicted value. That is, the controller 64 determines, on the basis of the accuracy information associated with the predicted value, whether the predicted value falls below the minimum reliability.

When the controller 64 determines that the prediction accuracy is equal to or higher than the reference A (No in step S106), the controller 64 then determines whether the prediction accuracy is less than the reference B (step S107). The reference B is a predetermined value that is a lower limit for keeping the sufficient reliability of the predicted value. That is, the controller 64 determines whether the predicted value falls below the lower limit for keeping the sufficient reliability.

When the controller 64 determines that the prediction accuracy is equal to or higher than the reference B (No in step S107), the processing proceeds to step S109 described later.

Conversely, when the controller 64 determines that the prediction accuracy is lower than the reference B (Yes in step S107), the controller 64 corrects the predicted value (step S108). Specifically, the controller 64 corrects the predicted value to reduce a possible loss caused by a wrong prediction in consideration of the possibility that the prediction is wrong since the accuracy of the predicted value does not exceed the reference for keeping the sufficient reliability. The controller 64, for example, corrects the predicted value to be lower so as to reduce the amount of electricity to be purchased to cover the shortage of electrical energy.

The controller 64 makes a heat storage control plan 1 (step S109). Specifically, the operation planner 645 makes an operation plan for a water heater included in the appliance 50, that is, a heat storage device, using the electricity rate table 81 received from the server 80. The operation planner 645, for example, makes the operation plan for achieving a time shift for the water heater to heat up water during the daytime. The water heater is typically operated late at night, but if the electricity rate table 81 includes a time period with low electricity rate even in the daytime, the operation of the water heater is time-shifted to the time period. In this time-shifting, the operation planner 645 shifts the water heating operation of the water heater, for example provided that the power consumption in the time period to which the operation is shifted does not exceed a peak-cut level.

The controller 64 makes a heat storage control plan 2 (step S110). Specifically, the operation planner 645 makes an operation plan for the heat storage device to reduce the amount of power generation using the generated power that is estimated to be surplus. For example, when there is a time period in which a surplus of the generated power exceeds the power consumption of the water heater, the operation planner 645, for example, shifts the water heating operation of the water heater to the time period. Specifically, the operation planner 645 shifts the water heating operation of the water heater, provided that the amount of power consumption in the time period to which the operation is shifted does not exceed a predicted amount of power generation.

When the controller 64 determines in step S106 that the prediction accuracy is lower than the reference A (Yes in step S106), the controller 64 does not shift the water heating operation of the water heater (step S111).

The controller 64 re-predicts the load (step S112). Specifically, the prediction calculator 643 predicts the amount of power to be consumed by the appliance 50, in accordance with the heat storage control plans 1 and 2 made in steps S109 and S110 as described above. In this case, the prediction calculator 643 also determines a predicted value per unit time, such as every 30 minutes, and associates the predicted value with the accuracy information. The controller 64 may then generate screen data for the re-predicted value, and display the screen data on the terminal device 70.

The controller 64 determines whether the prediction accuracy is lower than the reference A' (step S113). The reference A' is a predetermined value that is a lower limit for keeping the minimum reliability of the predicted value, for example, a limit that is more relaxed than the reference A described above. The reference A may be used instead of the reference A'.

When the controller 64 determines that the prediction accuracy is equal to or higher than the reference A' (No in step S113), the controller 64 determines whether the prediction accuracy is less than the reference B' (step S114). The reference B' is a predetermined value that is a lower limit for keeping the sufficient reliability of the predicted value, for example, a limit that is relaxed more than the reference B described above. The reference B may be used instead of the reference B'.

When the controller 64 determines that the prediction accuracy is equal to or higher than the reference B' (No in step S114), the processing proceeds to step S116 described later. Conversely, when the controller 64 determines that the prediction accuracy is lower than the reference B' (Yes in step S114), the controller 64 corrects the predicted value (step S115).

The controller 64 makes a power saving control plan 1 (step S116). For example, for the appliance 50 that can be controlled to contribute to power saving, the operation planner 645 makes a time-period based operation plan for energy savings so that the electricity bill cost is within a target.

The controller 64 makes a power saving control plan 2 (step S117). For example, for the appliance 50 that can be controlled to contribute to power saving, the operation planner 645 makes a time-period based operation plan for power savings in response to the demand response, that is, the DR request.

The controller 64 re-predicts the load (step S118). Specifically, the prediction calculator 643 predicts the amount of power to be consumed by the appliance 50, in accordance with the power saving control plans 1 and 2 made in steps S116 and S117 as described above. In this case, the prediction calculator 643 also determines a predicted value per unit time, such as every 30 minutes, and associates the predicted value with the accuracy information. The controller 64 may then generate screen data for the re-predicted value, and may cause display of the screen data on the terminal device 70.

The controller 64 determines whether the prediction accuracy is lower than the reference A" (step S119). The reference A" is a predetermined value that is a lower limit for keeping the minimum reliability of the predicted value, for example, a limit that is more relaxed than the reference A described above. The reference A may be used instead of the reference A".

When the controller 64 determines that the prediction accuracy is equal to or higher than the reference A" (No in step S119), the controller 64 determines whether the prediction accuracy is less than the reference B" (step S120). The reference B" is a predetermined value that is a lower limit for keeping the sufficient reliability of the predicted value, for example, a limit that is relaxed more than the reference B described above. The reference B may be used instead of the reference B".

When the controller 64 determines that the prediction accuracy is equal to or higher than the reference B" (No in step S120), the processing proceeds to step S122 described later. Conversely, when the controller 64 determines that the prediction accuracy is lower than the reference B" (Yes in step S120), the controller 64 corrects the predicted value (step S121).

The controller 64 optimizes selection of power sources (step S122). The controller 64, for example, optimizes a charge and discharge control of the power storage apparatus 10.

When the controller 64 determines in step S119 described above that the prediction accuracy is lower than the reference A" (Yes in step S119), the controller 64 notifies the power storage apparatus 10 that there is no change in the charge and discharge control (step S123).

This operation planning process enables a proper operation plan to be made using the accuracy of the predicted value.

In some cases, for example, the power storage and the heat storage are achieved only by the surplus power of the generated power to reduce the amount of power generation, that is, the charge control of the power storage apparatus 10 and the water heater included in the appliance 50 are operated only by the surplus power. In such cases, the amount of power generated by the power generation apparatus 20 varies greatly depending on the weather, which may cause a great difference between the actual value and the predicted value. In particular, when an appliance 50 incapable of easy change of the capability thereof, such as a heat pump water heater, is operated on the basis of the predicted value, the amount of power consumption may exceed the surplus power, thereby causing purchase of electricity. In such a case, however, present disclosure makes the operation plan without the use of the predicted value with the low accuracy or with the use of the predicted value corrected in accordance with the accuracy, which enables prior avoidance of the occurrence of the purchase of electricity.

Specifically, the prediction calculator 643 statistically processes a relationship between the predicted value and the actual value, and applies the result to the predicted value as accuracy information. This enables the operation planner 645 to know the reliability of the predicted value and make the operation plan using the reliability of the predicted value. Thus even when a misprediction occurs, the adverse effects that may be caused can be reduced while the appliance 50 keeps the user-preference based operation.

Improvement in the prediction precision involves increasing functionality of the prediction model 633, which typically raises concerns regarding an increase in the processing load or the required amount of memory in the power control device 60. However, the present disclosure does not need to increase the processing load or the required amount of memory because associating the accuracy information, or an index that indicates reliability, with the predicted value enables the power control device 60 to use the predicted value in various ways in accordance with the accuracy. The power control device 60 can thus achieve functions even at relatively low cost.

Other Embodiments

The above embodiment describes an example in which the power control device 60 makes an operation plan and uses the operation plan. However, in some embodiments, multiple operation plans may be suggested to a user so that the user can select one of the operation plans. In such cases, the power generation amount prediction screen P1 as illustrated in FIG. 3A and the power consumption amount prediction screen P2 illustrated in FIG. 3B may be presented to the user together with the operation plans. The user having recognized the reliability of prediction can then easily select one of the operation plans.

Figure 6A:
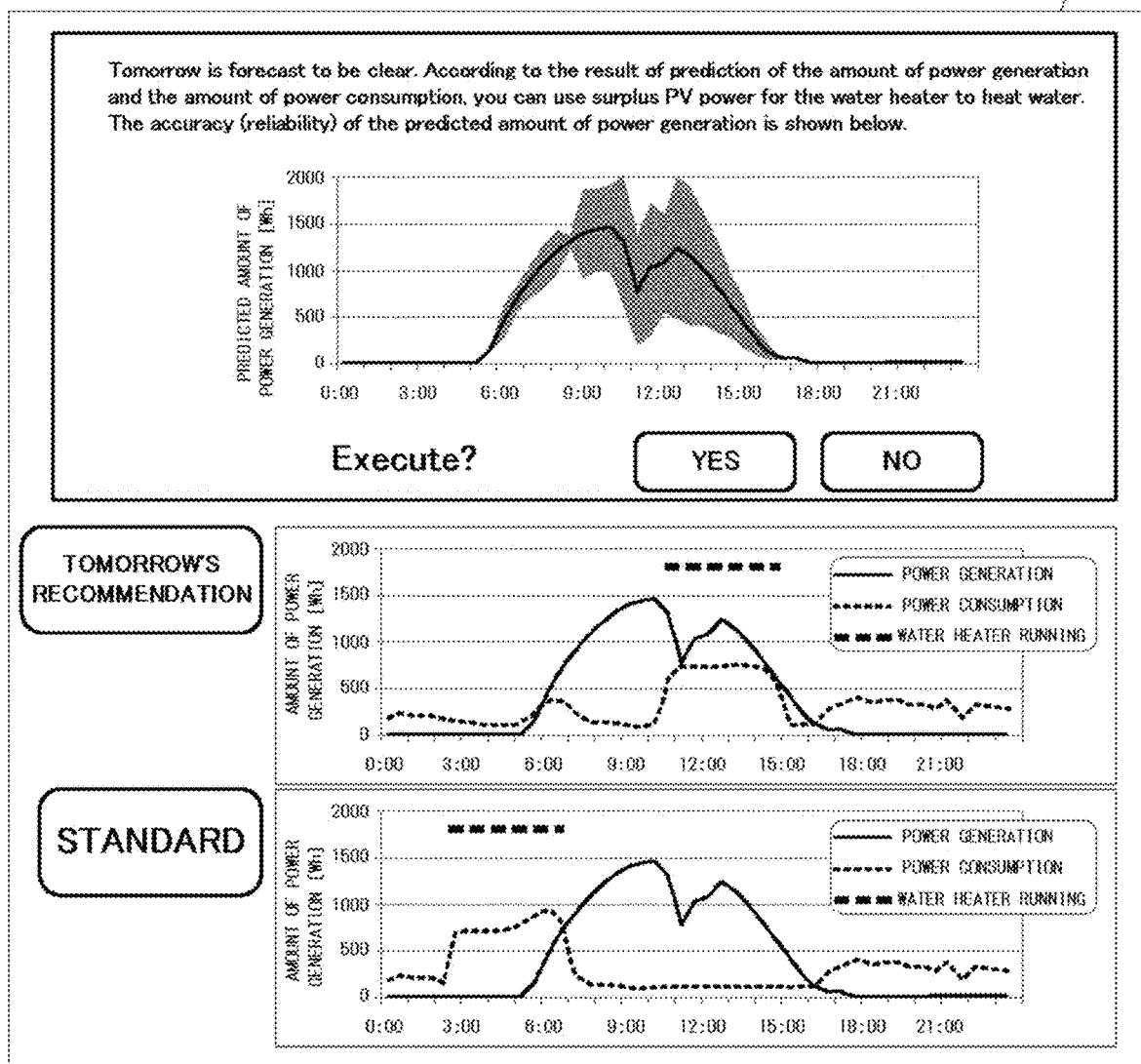
FIG. 6A is a schematic diagram illustrating an example of an operation plan selection screen.
Figure 6B:
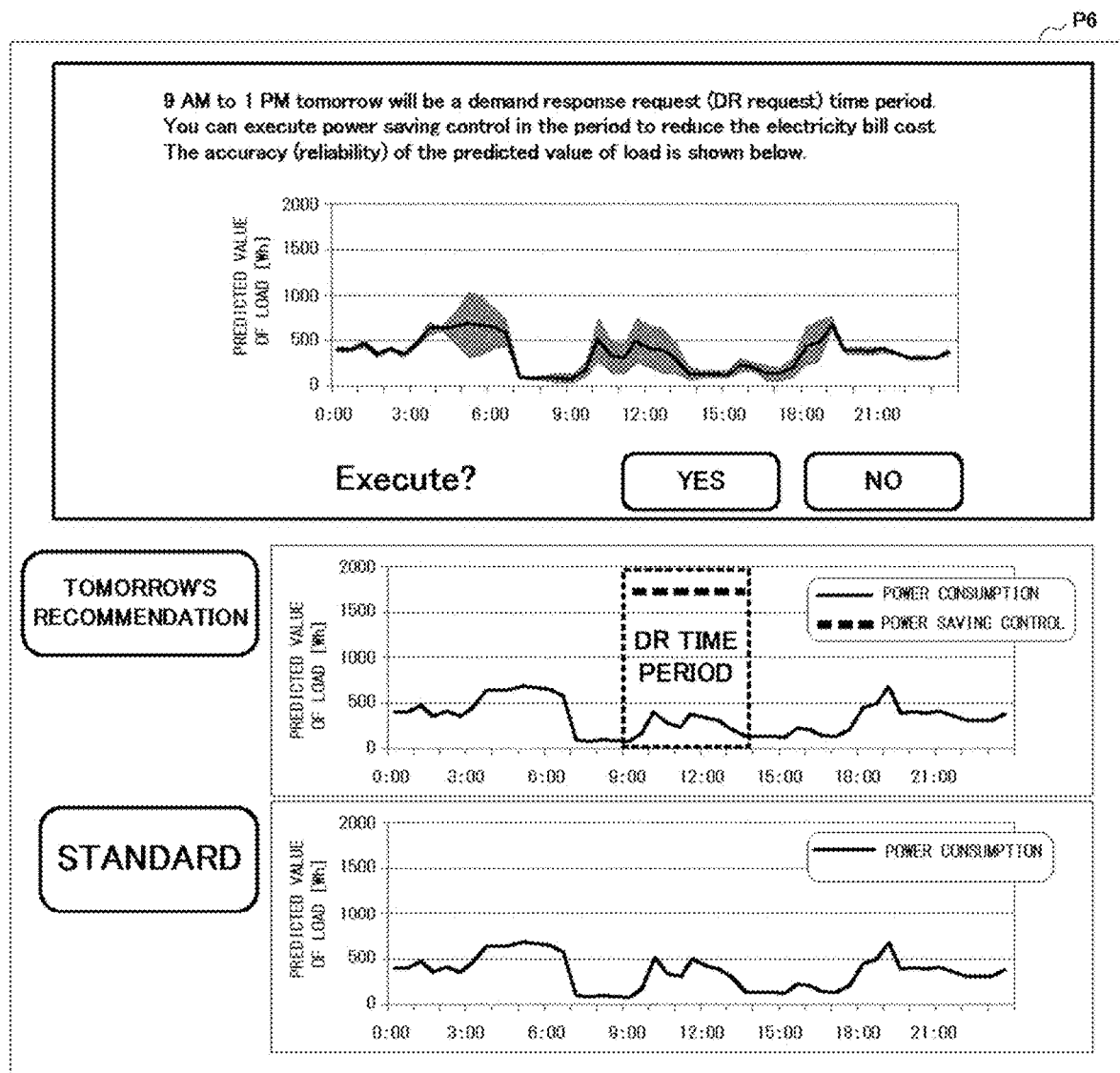
FIG. 6B is a schematic diagram illustrating an example of another operation plan selection screen.

Specifically, the display controller 644 may generate an operation plan selection screen P5 as illustrated in FIG. 6A and an operation plan selection screen P6 as illustrated in FIG. 6B, and may cause display of the screen data on the terminal device 70. The operation plan selection screens P5 and P6 help make the user recognize the reliability of the prediction, which leads to the user's easy selection of the operation plan.

The above embodiment describes an example in which the various screens are displayed on the terminal device 70. However, in some embodiments, the power control device 60 may be provided with a display, and may cause the various screens to be displayed on the display.

The above embodiment describes the home system 1 by way of example. However, in some embodiments, the present disclosure can be similarly applied to, for example, a building system installed in a building.

The above embodiment describes an example in which the power control device 60 is installed in the house H. However, in some embodiments, the power control device 60 may be installed outside the home H. The server 80 illustrated in FIG. 1, for example, may function as the power control device 60. In this case, the cost of consumed power can be properly visualized and displayed.

The above embodiment describes an example of the use of the dedicated power control device 60. However, in some embodiments, an operation program defining the operation of the power control device 60 may be applied to an existing personal computer or an information terminal device, thereby enabling such a personal computer to function as the power control device 60 according to the present disclosure.

Any distribution method of such a program can be selected, and the program may be distributed in a form of a computer-readable recording medium storing the program, such as a compact disc read-only memory (CD-ROM), a digital versatile disc (DVD), a magneto optical disc (MO), a memory card, and the like, or via a communication network, such as the Internet.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure can be applied to a power control device, an operation planning method, and a program that can achieve proper use of a predicted value of power.

REFERENCE SIGNS LIST

1 Home system
10 Power storage apparatus
20 Power generation apparatus
30 Breaker
40 Power measurement device
50 Appliance
60 Power control device
61 Inside-home communicator
62 Outside-home communicator
63 Data storage
631 User setting information
632 Management information
633 Prediction model
634 Operation plan
64 Controller
641 Information acquirer
642 Prediction model updater
643 Prediction calculator
644 Display controller
645 Operation planner
646 Appliance controller
70 Terminal device
80 Server
81 Electricity rate table
82 Weather forecast information

The invention claimed is:

1. A power control device for controlling power consumed or generated in a home system of a home including a power storage system, a power generation apparatus, and a power measurement device that detects power flowing through a power line in the home, the power control device using a predicted value of the power and comprising:
 a central processing unit (CPU), wherein the CPU is configured to
  update, for a unit time, an actual value of an amount of power generation and an amount of power consumption which is detected by the power measurement device for power consumed or generated in the home system, the actual value corresponding to the predicted value per the unit time,
  determine accuracy information which is an amount of error in the predicted value per the unit time based on the actual value for the unit time,
  make (i) using the predicted value, an operation plan by which an operating time period of an appliance that consumes the power is shifted to contribute to power saving, when the accuracy information for the unit time is greater than or equal to a first reference indicating a minimum reliability, and (ii) without using the predicted value, the operation plan by which the operating time period of the appliance is not shifted, when the accuracy information of the predicted value is less than the first reference,
  automatically control, by the CPU, the power storage system according to the operation plan.

2. The power control device according to claim 1, wherein the CPU is further configured to make the operation plan, when the accuracy information is greater than or equal to the first reference and is less than a second reference indicating a lower limit for keeping a sufficient reliability after correction of the predicted value.

3. The power control device according to claim 2, wherein the CPU is further configured to
 determine whether the accuracy information is less than the second reference,
 responsive to determining that the accuracy information is less than the second reference:
  correct the predicted value by reducing the predicted value, and
  use the reduced predicted value to make the operation plan.

4. The power control device according to claim 1, wherein the CPU is further configured to calculate by a prediction calculator the predicted value and the accuracy information.

5. The power control device according to claim 1, wherein the CPU is further configured to store the operation plan in a data storage and automatically control, based on the operation plan stored in the data storage, the power storage system, which includes a storage battery, to charge and/or discharge power and/or a solar panel or a fuel cell, to reverse power flow to a commercial power source and/or to supply the power consumed or generated in the home.

6. An operation planning method for a power control device for controlling power consumed or generated in a home system of a home including a power storage system, a power generation apparatus, and a power measurement device that detects power flowing through a power line in the home, the operation planning method comprising:
 predicting a predicted value of power consumed or generated in the home system,
 updating, for a unit time, an actual value of an amount of power generation and an amount of power consumption which is detected by the power measurement device for power consumed or generated in the home system, the actual value corresponding to the predicted value per the unit time,
 determining accuracy information which is an amount of error in the predicted value per the unit time based on the actual value for the unit time,
 determining the accuracy information of the predicted value per unit time is greater than or equal to a first reference indicating a minimum reliability, and
 making, using the predicted value of the power, an operation plan by which an operating time period of an appliance that consumes the power is shifted to contribute to power saving, in response to determining the accuracy information being greater than or equal to the first reference, and determining the accuracy information of the predicted value being less than the first reference, making without using the predicted value, the operation plan by which the operating time period of the appliance is not shifted, in response to determining the accuracy information of the predicted value being less than the first reference; and automatically controlling the power storage system according to the operation plan.

7. The operation planning method according to claim 6, further comprising making the operation plan, when the accuracy information is greater than or equal to the first reference and is less than a second reference indicating a lower limit for keeping a sufficient reliability after correction of the predicted value.

8. The operation planning method according to claim 7, further comprising determining whether the accuracy information is less than the second reference, responsive to determining that the accuracy information is less than the second reference:

correcting the predicted value by reducing the predicted value, and using the reduced predicted value to make the operation plan.

9. The operation planning method according to claim 6, further comprising calculating by a prediction calculator the predicted value and the accuracy information.

10. The operation planning method according to claim 6, further comprising storing the operation plan in a data storage and automatically controlling, based on the operation plan stored in the data storage, the power storage system, which includes a storage battery, to store and/or discharge power and/or a solar panel or a fuel cell, to reverse power flow to a commercial power source and/or to supply the power consumed or generated in the home.

11. A non-transitory computer-readable recording medium storing a program, the program causing a central processing unit (CPU) included in a computer for controlling power consumed or generated in a home system of a home including a power storage system, a power generation apparatus, and a power measurement device that detects power flowing through a power line in the home, to:

predict a predicted value of power consumed or generated in the home system, update, for a unit time, an actual value of an amount of power generation and an amount of power consumption which is detected by the power measurement device for power consumed or generated in the home system, the actual value corresponding to the predicted value per the unit time, make (i) using the predicted value of the power, an operation plan by which an operating time period of an appliance that consumes the power is shifted to contribute to power saving, when accuracy information which is an amount of error in the predicted value per the unit time based on the actual value for the unit time is greater than or equal to a first reference indicating a minimum reliability, and (ii) without using the predicted value, the operation plan by which the operating time period of the appliance is not shifted, when the accuracy information of the predicted value is less than the first reference; and automatically control the power storage system according to the operation plan.

12. The non-transitory computer-readable recording medium according to claim 11, wherein the program further configures the computer to make the operation plan, when the accuracy information is greater than or equal to the first reference and is less than a second reference indicating a lower limit for keeping a sufficient reliability after correction of the predicted value.

13. The non-transitory computer-readable recording medium according to claim 12, wherein the program further configures the computer to determine whether the accuracy information is less than the second reference, responsive to determining that the accuracy information is less than the second reference:

correct the predicted value by reducing the predicted value, and use the reduced predicted value to make the operation plan.

14. The non-transitory computer-readable recording medium according to claim 11, wherein the program further configures the computer to calculate by a prediction calculator the predicted value and the accuracy information.

15. The non-transitory computer-readable recording medium according to claim 11, wherein the CPU is further configured to store the operation plan in a data storage and automatically control, based on the operation plan stored in the data storage, the power storage system which includes a storage battery, to store and/or discharge power and/or a solar panel or a fuel cell, to reverse power flow to a commercial power source and/or to supply the power consumed or generated in the home.

* * * * *